United States Patent
Vlachou et al.

(10) Patent No.: US 11,038,741 B2
(45) Date of Patent: Jun. 15, 2021

(54) MULTI-USER VIRTUAL REALITY OVER WIRELESS NETWORKS

(71) Applicant: Hewlett Packard Enterprise Development LP, Houston, TX (US)

(72) Inventors: Christina Vlachou, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 15 days.

(21) Appl. No.: 16/589,670

(22) Filed: Oct. 1, 2019

(65) Prior Publication Data

US 2021/0099334 A1  Apr. 1, 2021

(51) Int. Cl.

| | |
|---|---|
| *A63F 13/00* | (2014.01) |
| *H04L 29/06* | (2006.01) |
| *A63F 13/211* | (2014.01) |
| *H04L 5/00* | (2006.01) |
| *H04B 7/0413* | (2017.01) |
| *G06T 19/00* | (2011.01) |
| *G02B 27/01* | (2006.01) |

(52) U.S. Cl.
CPC ...... *H04L 29/06034* (2013.01); *A63F 13/211* (2014.09); *G02B 27/017* (2013.01); *G06T 19/006* (2013.01); *H04B 7/0413* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 6,760,748 B1* | 7/2004 | Hakim | G09B 5/14 434/350 |
| 7,680,038 B1* | 3/2010 | Gourlay | H04L 43/0852 370/230 |
| 8,891,497 B1* | 11/2014 | Vleugels | H04W 84/22 370/338 |
| 2006/0215601 A1* | 9/2006 | Vleugels | H04W 74/06 370/328 |

(Continued)

OTHER PUBLICATIONS

Abari et al., "Enabling High-Quality Untethered Virtual Reality", 14th USENIX Symposium on Networked Systems Design and Implementation, Mar. 27-29, 2017, pp. 531-544.

(Continued)

*Primary Examiner* — Paul A D'Agostino
(74) *Attorney, Agent, or Firm* — Jaffery Watson Mendonsa & Hamilton (57) ABSTRACT

Embodiments are directed to multi-user virtual reality over wireless networks. An embodiment of a storage medium includes instructions for receiving a request at a network device for a virtual reality (VR) operation, the VR operation to serve VR client devices utilizing a wireless communication network; obtaining statistics regarding the wireless communication network and the VR client devices, the statistics including data transmission rates and data transmission quality; exposing the statistics to a server to assist with optimization of the wireless communication network; and facilitating optimization of the wireless communication network for multi-user VR operation based at least in part on the statistics.

15 Claims, 8 Drawing Sheets

(56) References Cited

U.S. PATENT DOCUMENTS

| | | | | |
|---|---|---|---|---|
| 2008/0268878 | A1* | 10/2008 | Wang | H04W 68/00 455/458 |
| 2009/0046573 | A1* | 2/2009 | Damnjanovic | H04W 36/305 370/216 |
| 2013/0325997 | A1* | 12/2013 | Higgins | H04L 67/125 709/208 |
| 2017/0070892 | A1* | 3/2017 | Song | H04W 48/20 |
| 2017/0126459 | A1* | 5/2017 | Dutronc | H04L 27/2697 |
| 2018/0227904 | A1* | 8/2018 | Raghunathan | H04W 72/048 |
| 2018/0262382 | A1* | 9/2018 | Manolakos | H04L 1/0033 |

OTHER PUBLICATIONS

Aruba Networks, "802.11ac In-Depth", White Paper, 2014, pp. 1-37.

Bao et al., "Motion-Prediction-Based Multicast for 360-Degree Video Transmissions", In 2017 14th Annual IEEE International Conference on Sensing, Communication, and Networking (SECON), 2017, 9 pages.

Boos et al., "FlashBack: Immersive Virtual Reality on Mobile Devices via Rendering Memoization", ACM, Jun. 25-30, 2016, 13 pages.

Chandra et al., "DirCast: A Practical and Efficient Wi-Fi Multicast System", 17th IEEE International Conference on Network Protocols, 2009, 10 pages.

Cisco, "Cisco Spark in VR", available online at <https://web.archive.org/web/20171003080624/https://www.ciscospark.com/VR/index.html>, Oct. 3, 2017, 3 pages.

Deng et al., "IEEE 802.11ax: Highly Efficient WLANs for Intelligent Information Infrastructure", IEEE Communications Magazine, Dec. 2017, pp. 52-59.

Insite VR, "VR Meetings for Architecture, Engineering, and Construction", available online at <https://web.archive.org/web/20180827122935/https://www.insitevr.com/>, Aug. 27, 2018, 3 Pages.

Lai et al., "Furion: Engineering High-Quality Immersive Virtual Reality on Today's Mobile Devices", ACM, Oct. 16-20, 2017, 13 pages.

Larry Alton, "How Important Is a Bring-Your-Own-Device Policy? 5 Strategies for Millennials", available online at <https://www.forbes.com/sites/larryalton/2017/03/27/how-important-is-a-byod-policy-5-strategies-for-millennials/#2ba096b71678>, Mar. 27, 2017, 7 pages.

Li et al., "MUVR: Supporting Multi-User Mobile Virtual Reality with Resource Constrained Edge Cloud", 2018 Third ACM/IEEE Symposium on Edge Computing, 2018, pp. 1-16.

Linux Wireless, "ath6kl Architecture", available online at <https://wireless.wiki.kernel.org/en/users/drivers/athfikl/architecture>, Jan. 26, 2015, 2 pages.

Microsoft HoloLens, "Mixed reality is ready for business", available online at <https://web.archive.org/web/20190228084831/https://www.microsoft.com/en-us/hololens>, Feb. 28, 2019, 4 pages.

Nayak et al., "Multi-User Downlink with Single-User Uplink can Starve TCP", In IEEE INFOCOM 2017—IEEE Conference on Computer Communications, 2017, 9 pages.

Oculus Business, "Virtual reality is revolutionising Business", Enterprise-Grade Virtual Reality, available online at <https://business.oculus.com/>, retrieved on Mar. 19, 2020, 5 pages.

Sol Rogers, "How VR, AR and MR Are Making a Positive Impact on Enterprise", available online at <https://www.forbes.com/sites/googlecloud/2020/03/04/building-it-security-requires-improving-teams/#691f5c8159d5>, May 9, 2019, 23 pages.

Sur et al., "Practical MU-MIMO User Selection on 802.11ac Commodity Networks", ACM, Oct. 3-7, 2016, 13 pages.

Tan et al., "Supporting Mobile VR in LTE Networks: How Close Are We?", ACM, vol. 2, issue No. 01, Article 08, Mar. 2018, 31 pages.

Tim Merel, "How AR and VR are driving return on investment in the Enterprise Reality Ecosystem", available online at <https://venturebeat.com/2019/04/25/how-ar-and-vr-are-driving-return-on-investment-in-the-enterprise-realityecosystem/>, Apr. 25, 2019, 11 pages.

VIVE Enterprise, "Revolutionize Your Business With Virtual Reality", available online at <https://enterprise.vive.com/us/>, 2011, 5 pages.

Zhong et al., "On Building a Programmable Wireless High-Quality Virtual Reality System Using Commodity Hardware", ACM, Sep. 2, 2017, 7 pages.

* cited by examiner

MULTI-USER VIRTUAL REALITY OVER WIRELESS NETWORKS

BACKGROUND

Virtual reality (VR) operations have expanded from individual operations, such as certain gaming and other entertainment functions, to multi-user operations, including usages in enterprise environments for communication, collaboration, and training. Further, preferred operations have moved to wireless, untethered VR using wireless data communication technology, such as Wi-Fi, because the untethered operation can provide significant advantages in convenience and user experience.

However, there are challenges in providing VR to multiple users in untethered operation, with the challenges including the data network requirements, such as signal delay and data rates thresholds, that need to be met in order to provide high quality untethered VR operation.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to multi-user virtual reality over wireless networks.

In some embodiments, an apparatus, system, or process operates to provide for optimization of multi-user virtual reality operation over a wireless network.

As used herein, virtual reality (VR) refers to an artificial or simulated environment that is provided by sensory stimuli, and in particular is provided by using a VR headset or other VR visual presentation technology.

As used herein, multi-user (or multiple user) virtual reality (MU-VR) refers a virtual reality operation in which multiple client devices or systems (which may generally referred be to as clients) are receiving VR data from a VR system, such as provided by a server, wherein the clients are receiving related VR data and are located within a particular physical area or region. A client device may include a VR headset for use of a particular user.

As used herein, untethered VR refers to a VR system that receives and transmits data wirelessly, and does not include wired cables for VR operation. Untethered VR may also generally be referred to here as wireless VR operation.

Untethered VR may utilize one or more wireless network technologies, including, but not limited to, Wi-Fi (including IEEE (Institute of Electrical and Electronic Engineers) 802.11ac and 802.11ax), LTE (Long Term Evolution)/5G, and mmWave (Millimeter Wave) technologies. However, Wi-Fi generally includes better indoor coverage, unlimited free data, and on-premise network management for enterprises, and thus may be preferred choice for untethered multi-user VR.

However, supporting multi-user VR in enterprise Wi-Fi presents certain difficulties. Multi-user VR generally demands a high fidelity, seamless experience, which creates challenges in that VU-VR clients require high-bandwidth wireless and have a strict delay deadline. Further, the demands of all VR clients in a VR environment must be met.

In some embodiments, an apparatus, system, or process provides for VR-aware operation that includes optimization of VR operation to allow for each VR client to receive necessary bandwidth with sufficiently small signal delay to allow for a high quality VR experience for all users. In some embodiments, the optimization of VR operation includes one or more of the following:

(1) Selection between multi-user and single user MIMO mode—MU-MIMO (Multiple-User MIMO (Multiple Input Multiple Output)) does not necessarily provide better performance than SU-MIMO (Single User MIMO) for multiple user VR because MU-MIMO, while providing gains under certain conditions of high traffic demands, also adds harmful overheads to VR applications. In some embodiments, an apparatus, system, or process provides for selection of optimal SU/MU-MIMO mode per transmission based on a delay estimation for each. In new IEEE 802.11ax standard, this translates into selection between orthogonal frequency-division multiple access (OFDMA) and MU-MIMO modes.

(2) Selection between multicast and unicast transmission mode—Multicast may unnecessarily lock some VR clients to a lower data rate. In some embodiments, an apparatus, system, or process is to predict possible sets of common frames among users for an interval, forms multicast groups based on frames shared between users, and to compute latencies of multicast and unicast for each group to select between multicast and unicast for each group.

(3) Interference tolerance—Interference mitigation is provided in, for example, enterprise Wi-Fi, but this is not sufficient for VR. Due to VR's stringent QoE (Quality of Experience) requirements, even the mitigated interference can result in significant performance degradation for VR operation. In some embodiments, an apparatus, system, or process is to provide for tolerance of inter-AP interference (rather than impose interference mitigation) through traffic prioritization for VR (VR receiving a high priority that is less than a maximum priority), and through VR quality adaptation based on throughput and interference estimations.

Figure 1:
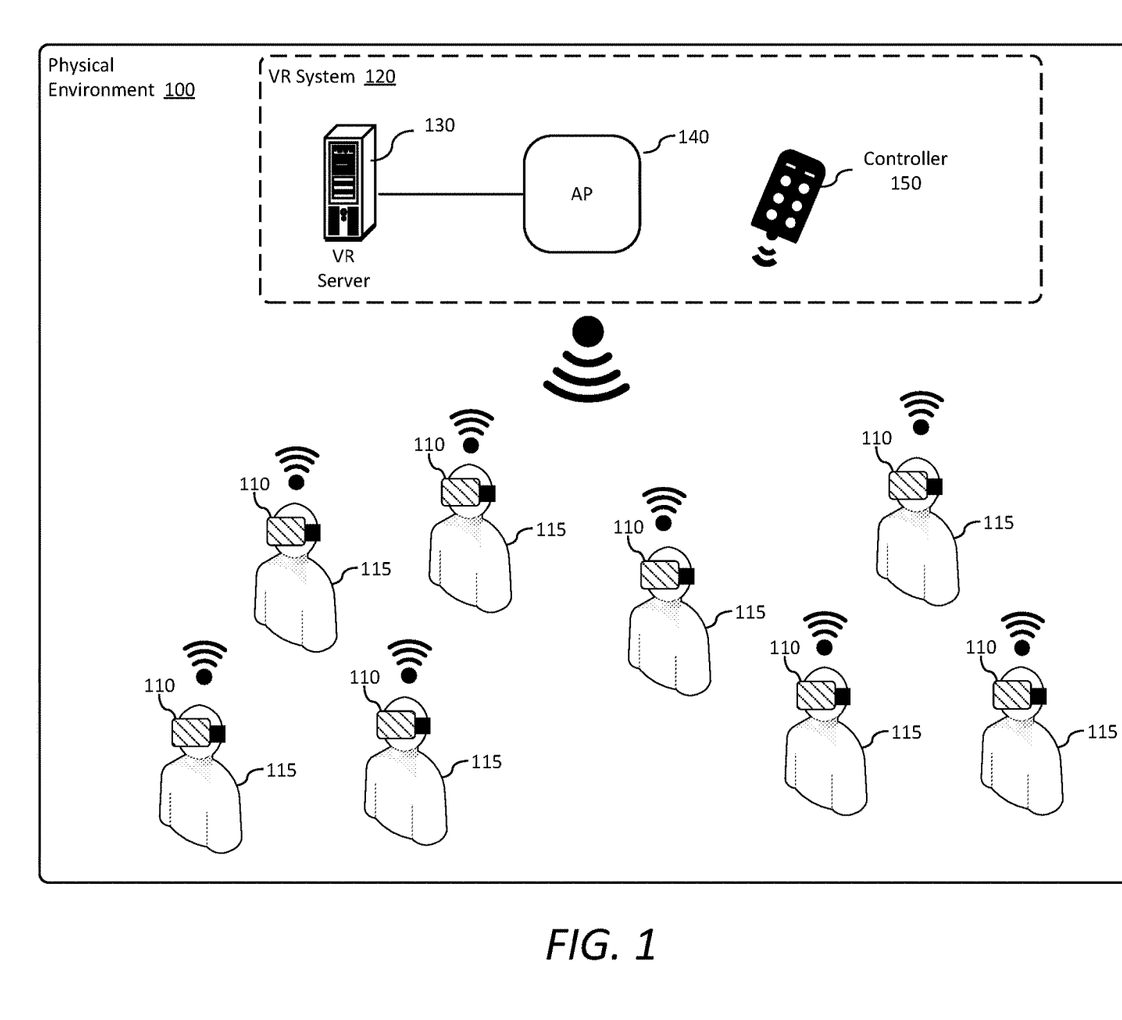
FIG. 1 is an illustration of a network environment to provide multi-user VR operation according to some embodiments.

FIG. 1 is an illustration of a network environment to provide multi-user VR operation according to some embodiments. In a particular physical environment 100, which may include, but is not limited to, a certain room, building, or other location, multiple client devices 110 are to receive VR services from a network element such as an access point (AP) 140 in a multi-user VR system. As used herein, access point (also referred to as a wireless access point (WAP)) refers to a networking hardware device that allows devices to connect with a network or service, such as a connection to a VR server 130 of the VR system 120, wherein the VR server 130 is an edge server to provide VR data to the client devices 110 via the AP 140 for VR service to a user 115 of each client device 110.

Each client device 110 may include, but is not limited to, a VR headset, such as illustrated in FIG. 1. The client devices 110 are also to provide/transmit data to the server 130 via the AP 140, wherein such data may include location, orientation, motion, acceleration, or other data required for VR operation. The VR system may further include a controller 150 to provide control of VR elements, including certain control of the client devices 110. As illustrated in FIG. 1, VR services provided by the VR system 120 are untethered VR services, with the users 115 being able to move about in the location in certain ways (depending the degrees of freedom provided by the VR services) within the physical environment 100 without connection to wires. While the VR system 120 is illustrated in FIG. 1 as being located within the same physical environment 100 as the client devices 110 for ease of illustration, some or all of the VR system 120 may be located outside of the physical environment 100.

In some embodiments, the access point 140 of the VR system 100 is to provide wireless communications with the client devices 110 utilizing communications technology that may include, but is not limited to, Wi-Fi technology according to IEEE 802.11ac or 802.11ax.

In some embodiments, the wireless network operation provided by the VR system 120 may include support for MIMO (Multiple Input Multiple Output) operation, where MIMO is a wireless technology in which the capacity of a radio link is increased by utilizing multiple transmission and receiving antennas to send and receive more than one data signal simultaneously over the same radio channel through multipath propagation. In some embodiments, the VR system 120 includes support for SU-MIMO (Single User MIMO) and MU-MIMO (Multiple User MIMO). MU-MIMO allows concurrent downlink data streams from an AP to a group of clients, while SU-MIMO is limited to a single user. In some 802.11ax APs, system 120 includes support for orthogonal frequency-division multiple access (OFDMA) that divides the bandwidth among users, to enable concurrent transmissions.

In some embodiments, the wireless network operation provided by the VR system 120 may include capability of providing both multicast and unicast transmission. A system may utilize multi-cast to provide for shared objects among users. For example, the VR system 120 may decouple shared background VR frames form each VR clients' interactive objects to save bandwidth and reduce latency for background VR frames.

In some embodiments, the wireless network operation provided by the VR system 100 includes capabilities to address inter-AP interference. In some embodiments, the capabilities include, but are not limited to, a capability to establish priorities among different types of signals, and a capability to provide for VR quality adaptation based on available throughput and throughput demand.

In some embodiments, the access point 140 is to obtain statistics including data transmission rates and data transmission quality, and to provide such statistics to VR server 130 to assist in optimization of the wireless network for multi-user VR operation. In some embodiments, the VR system 120 is to provide services to optimize the untethered VR operation, which may include the optimizations illustrated in FIGS. 2-5.

Figure 2:
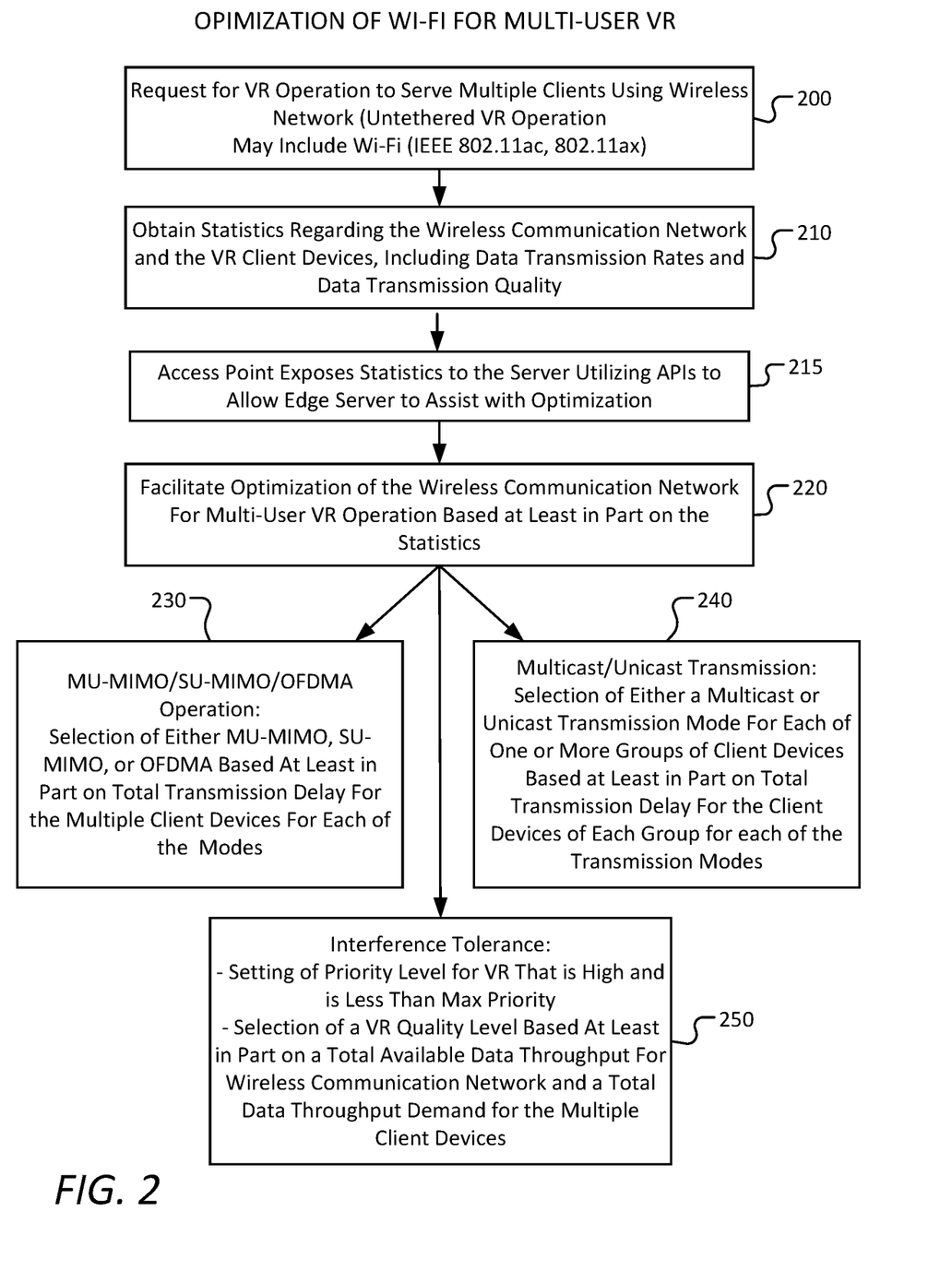
FIG. 2 is a flow chart to illustrate optimization of wireless network operations for multi-user VR operation according to some embodiments.

FIG. 2 is a flow chart to illustrate optimization of wireless network operations for multi-user VR operation according to some embodiments. In some embodiments, a process includes receiving a request for VR operation in a VR system to serve multiple clients 200. The VR operation may include, for example, the operation illustrated in FIG. 1 in which multiple VR client devices are present in a particular physical environment to provide VR services for multiple users, with the VR client devices including, for example, untethered VR headsets that receive VR data from a network device, such as a Wi-Fi access point operating under, for example, IEEE 802.11ac or 802.11ax.

Figure 6:
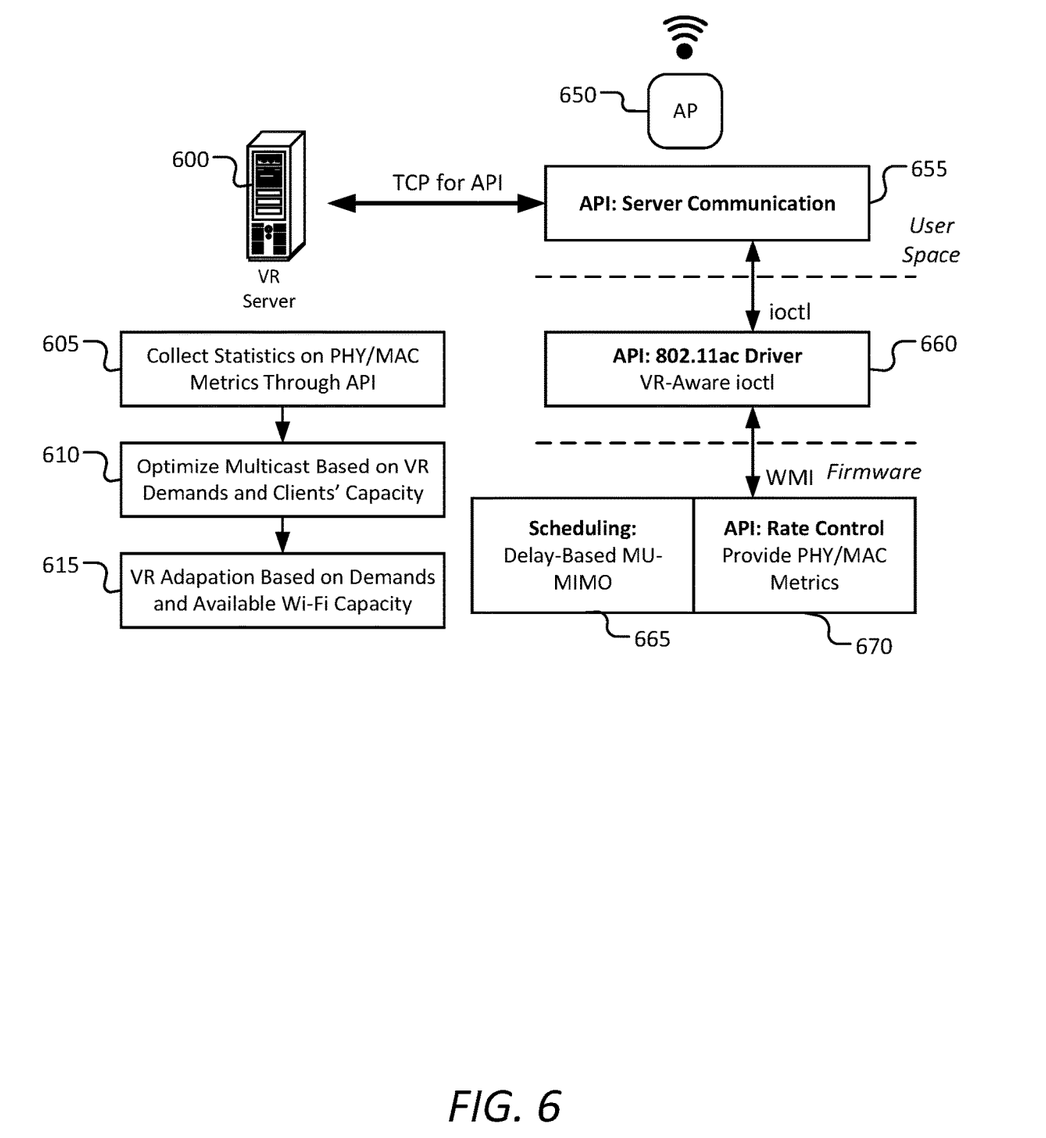
FIG. 6 illustrates multi user VR optimization enabled by one or more APIs according to some embodiments.

In some embodiments, the process includes obtaining statistics regarding the wireless communication network and the VR client devices 210. The statistics in general include data to indicate the demands of the VR client devices in receiving VR service, and the ability of the VR system to provide the data as required for VR services. The statistics may include, but are not limited to, statistics regarding data transmission rates and data transmission quality. In some embodiments, the access point is to expose statistics to an edge server utilizing APIs (Application Program Interfaces) 215, such as illustrated in FIG. 6. Based at least in part on the statistics, the process includes facilitating optimization of the wireless communication network for multi-user VR operation 220, wherein the optimization includes one or more of the following optimizations:

(1) MU-MIMO/SU-MIMO Operation: Selection of either MU-MIMO or SU-MIMO, or, for 802.11ax operation, selection of either MU-MIMO or OFDMA, based at least in part on the total transmission delay for the multiple client devices being served in the multi-user VR operation 230.

(2) Multicast/Unicast Transmission Mode: Selection of either a multicast or unicast transmission mode for each of one or more groups of client devices based at least in part on total transmission delay for the client devices of each group for each of the transmission modes 240, as illustrated in more detail in FIG. 4

(3) Interference Tolerance; Setting of a priority level for VR traffic that is less than a maximum priority; and selection of a VR quality level for the multi-user VR operation based at least in part on a total available data throughput for wireless communication network and a total data throughput demand for the multiple client devices 250, as illustrated in more detail in FIG. 5.

Figure 3:
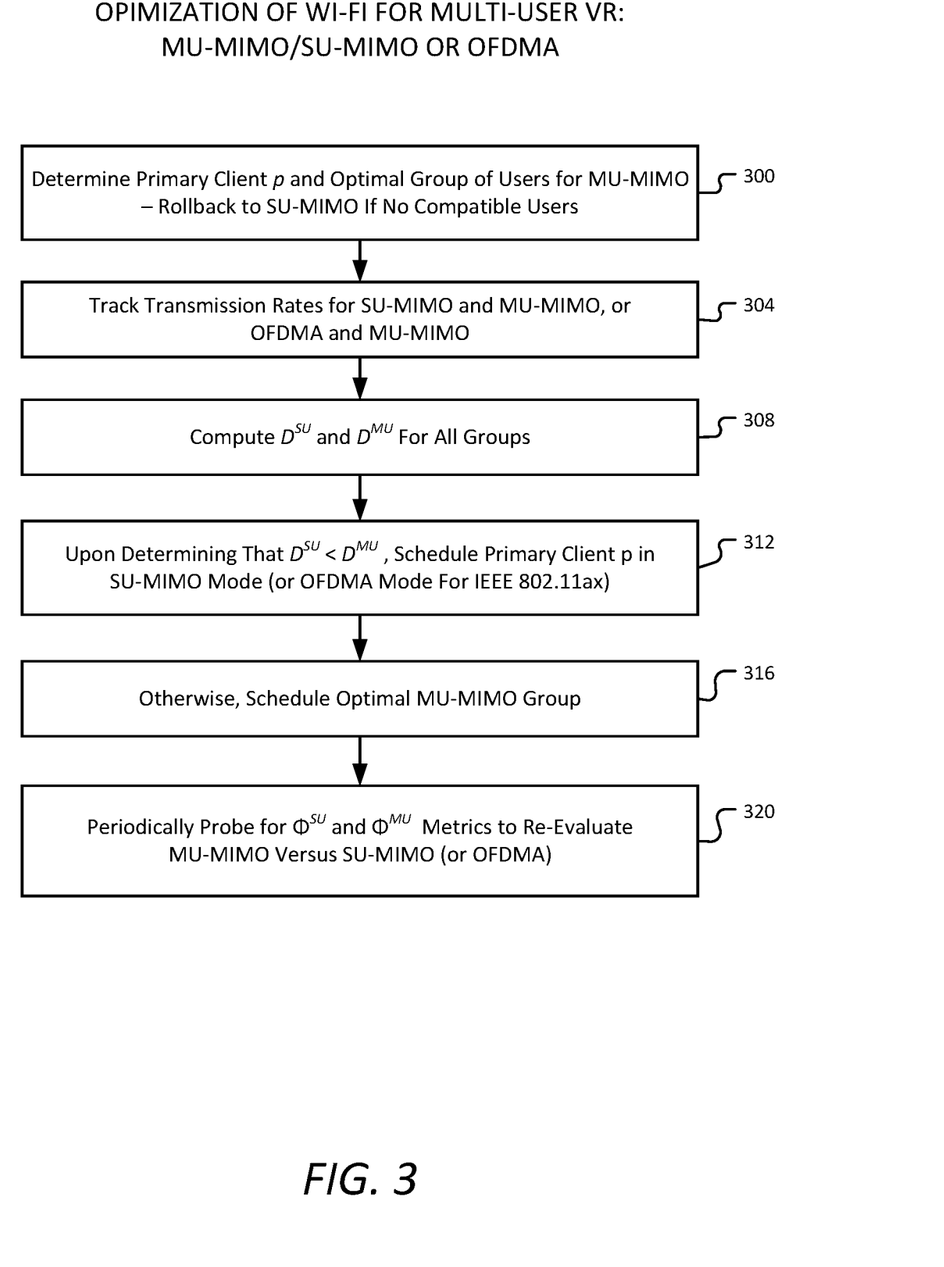
FIG. 3 is a flow chart to illustrate optimization in a VR system utilizing selection of a MU-MIMO or SU-MIMO mode in some embodiments.

FIG. 3 is a flow chart to illustrate optimization in a VR system utilizing selection of a MU-MIMO or SU-MIMO mode in some embodiments. Because of potential interference or slower streams, MU-MIMO does not always outperform SU-MIMO for multi-user VR. In some embodiments, a VR service includes optimization in which a selection of an MU-MIMO mode SU-MIMO mode is made per transmission, wherein the selection is based at least in part on a theoretical model for VR delay and on PHY-layer measurements at the AP.

Table 1 summarizes the notations utilized in a model expressing SU-MIMO and MU-MIMO.

TABLE 1

Notations for VR Optimization

| Variable | Description | Value |
|---|---|---|
| N | Number of MU-MIMO users | From AP |
| $\Phi_i$ | PHY rate (bytes/s) for user i | From AP |

TABLE 1-continued

Notations for VR Optimization

| Variable | Description | Value |
|---|---|---|
| $f_i$ | Number of queued bytes for user i | From AP |
| $O^{SU}$ | SU overheads (preamble, RTS/CTS, BA, SIFS) | 312 μs |
| $O^{MU}$ | MU overheads (sounding, ACKs) | 1000/1500 μs |
| $D^{SU}$ | Latency per SU transmission cycle | Model |
| DMU | Latency per MU transmission cycle | Model |

It is assumed in a model that the AP has sufficient downlink VR data for at least 2 clients (otherwise only SU-MIMO is available), and the per-client Wi-Fi frame transmission time in SU and MU modes are modeled separately. In SU-MIMO, a VR client's Wi-Fi frame transmission time is modelled as $f_i/\Phi^{SU}_i + OSU$, where $\Phi^{SU}_i$ represents SU-mode PHY rate, $f_i$ represents the bytes in a client's downlink queue, and $O^{SU}$ represents MAC-layer transmission delay overheads (backoff, interframe spaces, preambles, and ACKs). In MU-MIMO, such Wi-Fi frame transmission time is $f_i/\Phi^{MU}_i + O^{MU}$, where $O^{MU}$ is the delay overhead in MU-MIMO mode. $O^{MU}$ is generally significantly higher than $O^{SU}$ due to channel sounding and feedback phases (which may be approximately 1-1.5 ms more per transmission). In 802.11ax, similar approach is be followed, replacing SU-MIMO with OFDMA.

To fairly compare SU-MIMO and MU-MIMO, the MU-MIMO airtime gains are modeled due to concurrent user transmissions. In MU-MIMO, the latency (delay) for a group would be equal to the maximum transmission duration among all users plus MU-MIMO and MAC overheads. In SU-MIMO, the same transmission cycle would require individual transmissions. Thus, the total latency $D^{SU}$ and $D^{MU}$ in SU-MIMO and MU-MIMO, respectively, are the sum of transmission delays among all users plus MAC overheads, as provided in equations [1] and [2]:

$$D^{SU} = \sum_{0 \le i \le N-1} \left( \frac{f_i}{\Phi^{SU}_i} + O^{SU} \right) \quad [1]$$

$$D^{MU} = O^{MU} + \max_{0 \le i \le N-1} \frac{f_i}{\Phi^{MU}_i} \quad [2]$$

where N is the total number of VR clients in the group.

The model utilized herein addresses the tradeoffs of different MAC schemes and may be extended to next-generation 802.11ax Wi-Fi, where OFDMA and MU-MIMO will provide different performance tradeoffs in terms of throughput and latency.

In some embodiments, a process includes determining a primary client i and optimal group of users for MU-MIMO, with a rollback to SU-MIMO mode if there are no compatible users for such group 300. Transmission rates are tracked for SU-MIMO and MU-MIMO modes 304, and the delay associated with SU-MIMO and MU-MIMO, $D^{SU}$ and $D^{MU}$, is computed for each group 308.

Upon determining that the SU-MIMO latency, $D^{SU}$, is less than the MU-MIMO latency, $D^{MU}$, the primary client is to be scheduled in SU-MIMO mode 312. Otherwise, the optimal MU-MIMO group is be scheduled 316. In some embodiments, the process further provides for periodically probing for PHY rate metrics for SU-MIMO and MU-MIMO, $\Phi^{SU}$ and $\Phi^{MU}$, to re-evaluate the selection of SU-MIMO versus MU-MIMO 320.

In some embodiments, an algorithm for delay-based SU-MIMO/MU-MIMO may be as expressed in Table 2:

TABLE 2

Algorithm for SU-MIMO/MU-MIMO Mode Selection

| | |
|---|---|
| 1: | Constants: $O^{MU}$, $O^{SU}$ (profiled in Wi-Fi AP scheduler) |
| 2: | Inputs: $\Phi^{SU}_i$, $\Phi^{MU}_i$, $f_i$, for all clients $0 \le i \le N - 1$ |
| 3: | Run default AP scheduler: determines primary client p and optimal MU group |
| 4: | Delay estimation: Compute $D^{SU}$ and $D^{MU}$ for all groups |
| 5: | Output schedule: |
| 6: | IF $D^{SU} < D^{MU}$ then |
| 7: |    schedule primary client p in SU mode |
| 8: | else |
| 9: |    schedule optimal MU group |
| 10: | end if |
| 11: | Re-evaluate inputs: Periodically probe for $\Phi^{SU}_i$, $\Phi^{MU}_i$, metrics |

Figure 4:
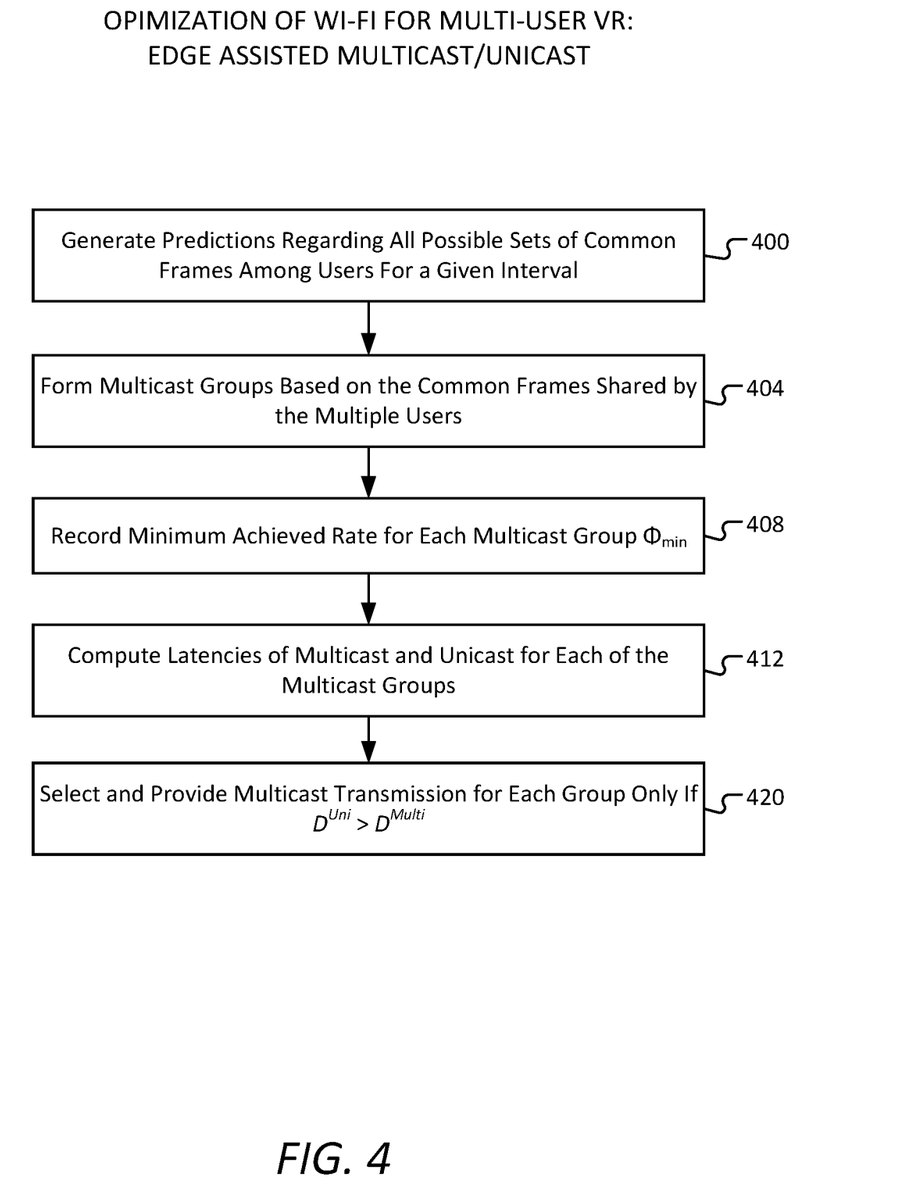
FIG. 4 is a flow chart to illustrate optimization in a VR system utilizing edge-assisted selection of multicast or unicast transmission in some embodiments.

FIG. 4 is a flow chart to illustrate optimization in a VR system utilizing edge-assisted selection of multicast or unicast transmission in some embodiments. Multicast is useful for multi-user VR only in circumstances in which (1) VR clients share the same data; and (2) VR clients experience similar wireless qualities, so that their rates will not be locked to the slowest ones. In some embodiments, this is addressed through collaboration between the Wi-Fi access point and the edge server: The AP is the vantage point in a system that may monitor capacity per user and achievable multicast throughput, while the server is the vantage point that may predict which users will share data and when such sharing will occur.

In some embodiments, an access point is to expose Wi-Fi statistics to an edge server, as provided in element 215 in FIG. 2, with such sharing being performed via APIs as illustrated in FIG. 6, to allow the edge server to assist in the multicast decision. The server is to generate predictions regarding all possible sets of common frames among users for a given interval 400, and to form multicast groups based on the common frames shared by users in the multi-user VR operation 404.

Figure 5:
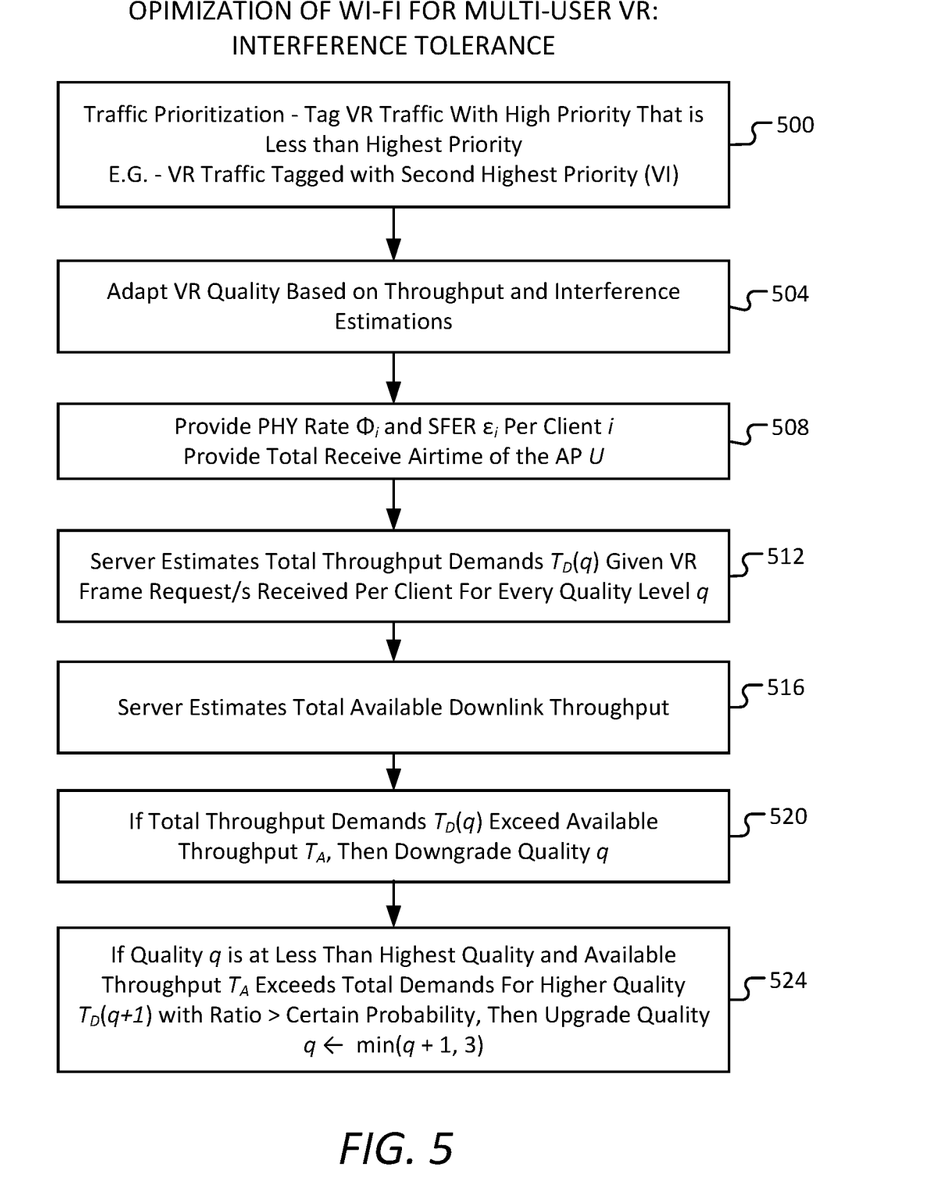
FIG. 5 is a flow chart to illustrate optimization in a VR system utilizing interference tolerance in some embodiments.

In some embodiments, the server is then to transmit the common frames only if there are airtime gains with multicast. Using the API, the edge server is to record a minimum achieved rate per multicast group, $\Phi_{min}$ 408, and to compute the latencies of multicast and unicast for every group 412, as provided in equations [3] and [4]:

$$D^{Uni} = \sum_{i=0}^{N-1} \left( \frac{f}{\Phi^{Uni}_i} + O^{SU} \right) \quad [3]$$

$$D^{Multi} = \frac{f}{\Phi^{min}} \quad [4]$$

where f=the number of bytes to be shared by the group
$\Phi^{Uni}_i$=the unicast rate for client i FIG. 5 is a flow chart to illustrate optimization in a VR system utilizing interference tolerance in some embodiments. In some embodiments, a process includes traffic prioritization wherein VR traffic is assigned a priority that is less than a highest priority 500. In Wi-Fi under 802.11ac, the highest priority designation is usually applied to voice and video. With a mobile user running VR on a screen it is not possible to have other high priority traffic for the same client. In some embodiments, VR is not tagged with a highest priority (V0) as this traffic is extremely bandwidth intensive in multi-user environment, and can have harm low-bandwidth, delay sensitive applications from other co-channel APs, such as VoIP traffic. In some embodiments, the VR traffic is assigned a second-highest priority (VI).

In some embodiments, process includes VR quality adaptation, with the quality being adapted based on throughput and interference estimations 504. In some embodiments, an API, as illustrated in FIG. 6, may be leveraged to provide the PHY rate and SFER (Sub-Frame Error-Rate) $\varepsilon_i$ for each client i, and to provide a total receive airtime for the access point U 508, which accounts for uplink and interference transmissions.

In some embodiments, the server is to estimate total throughput demands $T_D(q)$ given the frame requests per second received per client for every quality level q 512. In a particular example there are four quality levels, with $0 \leq q \leq 3$. The server is further to estimate the total available downlink throughput 516, wherein the downlink throughput may be estimated by equation [5], which takes into account the total MAC overheads over TCP $O^{TCP}$ (which is determined offline) and the average PHY and errors rates in a system. This assumes every client has similar PHY and PER rates and thus the quality q may be scaled for all clients.

$$T_A = \Sigma_{0 \leq i \leq N-1} \Phi_i (1-\varepsilon_i)(1-U)O^{TCP}/N \quad [5]$$

In some embodiments, if the total demands exceed the available throughput, then the server is to downgrade (reduce) the quality q 520, such as reduction from q=3 to q=2. Otherwise, if q is not a highest level, q=3, the server seeks to upgrade (increase) the quality upon determining that a ratio of $T_D(q+1)/T_A$ is less than a certain probability in order to avoid unwanted quality oscillations 524. Thus, the quality may be increased by 1, with a maximum being 3. In a particular example, an algorithm for VR quality adaptation may be as expressed in Table 3:

TABLE 3

| Algorithm for VR Quality Adaptation |
|---|
| 1: Constants: $O^{OTP}$ |
| 2: Inputs from API: $\Phi_i$ for all clients $0 \leq i \leq N - 1$, U |
| 3: $T_A$ estimation: $T_A = \Sigma_{0 \leq i \leq N-1} \Phi_i (1 - \varepsilon_1)(1 - U)O^{TCP}/N$ |
| 4: $T_D$ estimation: Server computes total bytes/s $T_D(q)$, $0 \leq q \leq 3$ |
| 5: Output Quality: |
| 6: if $T_A < T_D(q)$ then |
| 7: $q \leftarrow \max(0, q - 1)$ |
| 8: else if $q < 3$ and $T_A > T_D(q + 1)$ |
| 9: $p \leftarrow \text{random}(0, 1)$ |
| 10: if $T_D(q + 1)/T_A < p$ |
| 11: q min( q - 1, 3) |
| 12 end if |
| 13 end if |
| 14 Repeat every 100 Wi-Fi frames |

FIG. 6 illustrates multi user VR optimization enabled by one or more APIs according to some embodiments. In some embodiments, a server 600 and access point 650 provide support for multi-user VR operation, including optimizations as illustrated in FIGS. 2-5.

In some embodiments, an API 655 of the access point 650 provides communications with the server 600 via TCP. As illustrated, the server provides for collecting statistics on the PHY and MAC through the API 605, optimizing application of multicast transmission based on VR demands and clients' capacity 620, and VR quality adaptation based on demands and available Wi-Fi capacity 615.

As further illustrated, the API includes 802.11ac driver 660 providing VR-aware ioctl (input/output control). The access point further includes firmware including delay based MU-MIMO (providing support for intelligent selection of MU-MIMO or SU-MIMO, or selection of MU-MIMO or OFDMA) 665 and API rate control to provide the PHY and MAC metrics 670 that are exposed to the server 600 via the API.

Figure 7:
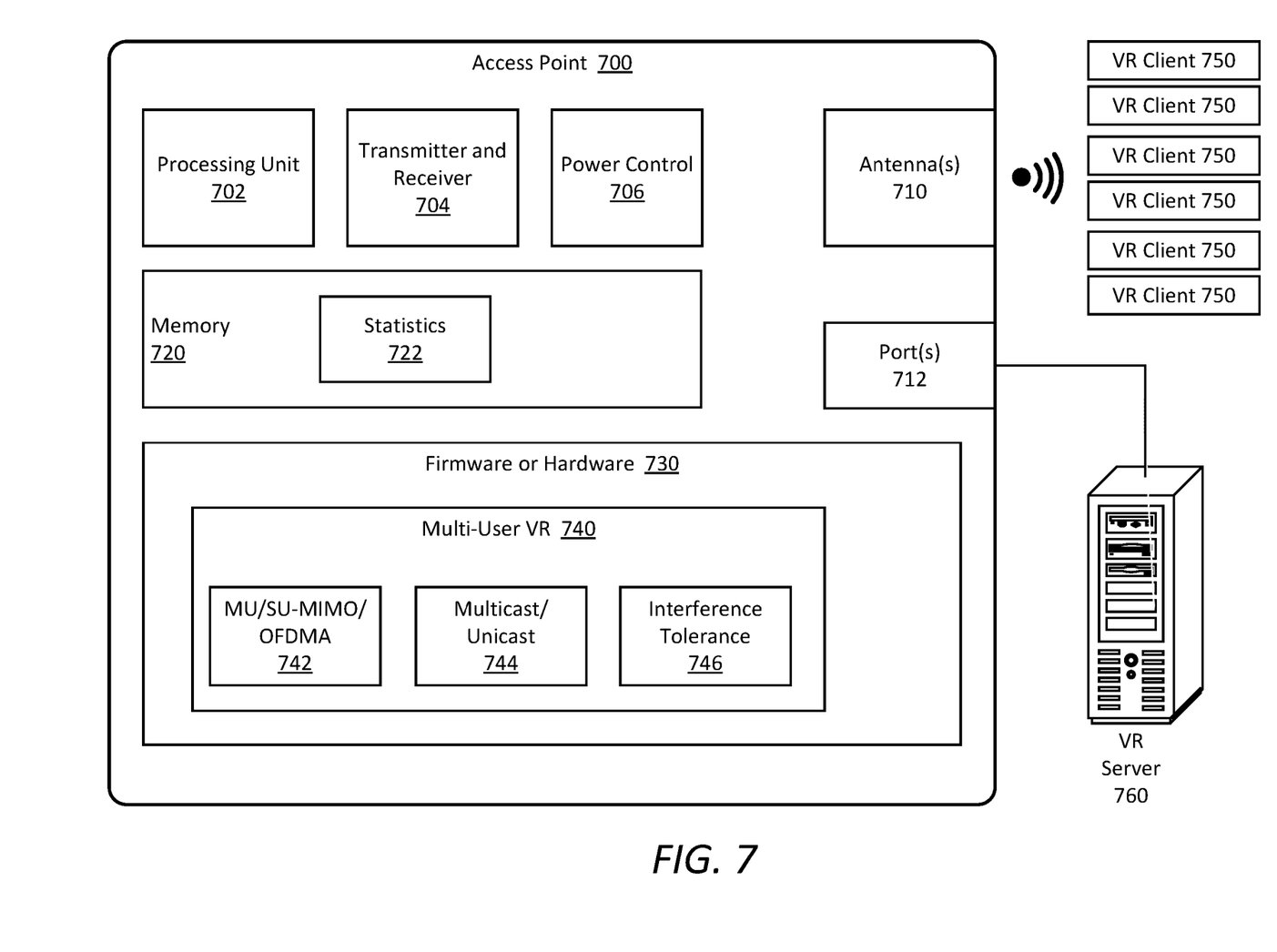
FIG. 7 is a block diagram to illustrate an access point to provide multi-user VR services in according to some embodiments.

FIG. 7 is a block diagram to illustrate an access point to provide multi-user VR services in according to some embodiments. An access point includes additional components and elements not illustrated in FIG. 7, which is simplified for sake of illustration. In some embodiments, an access point 700 includes a processing unit 702, a transmitter and receiver 704, power control 706, one or more antennas 710 for wireless signal communication, and one or more ports 712 for network connections or other connections. In some embodiments, the access point 700 is a part of a VR system, such as VR system 120 illustrated in FIG. 1, to provide VR services to multiple untethered clients, such as VR clients 750 receiving wireless data transmitted by the access point 700. In some embodiments, the access point 700 is connected to a VR server 760 to generate VR data for transmission to the VR clients 750.

The access point 700 may further include memory 720 for storage of data, which may include volatile and nonvolatile memory (including flash memory and similar elements), registers, and other storage technologies. The memory 630 may include storage of data, including statistics data regarding data transmission rates and data transmission quality that is collected, and is to be exposed to the VR server 760 for processing in optimizing multi-user VR services.

In some embodiments, the access point 700 further includes firmware or hardware or both 730, the firmware or hardware including technology for optimization of multi-user VR services, including, bur not limited to, technology relating to selection between SU-MIMO and MU-MIMO modes (or between OFDMA and MU-MIMO modes modes) 742, such as illustrated in FIG. 3, selection of multicast or unicast transmission such as illustrated in FIG. 4, and interference tolerance such as illustrated in FIG. 5.

Figure 8:
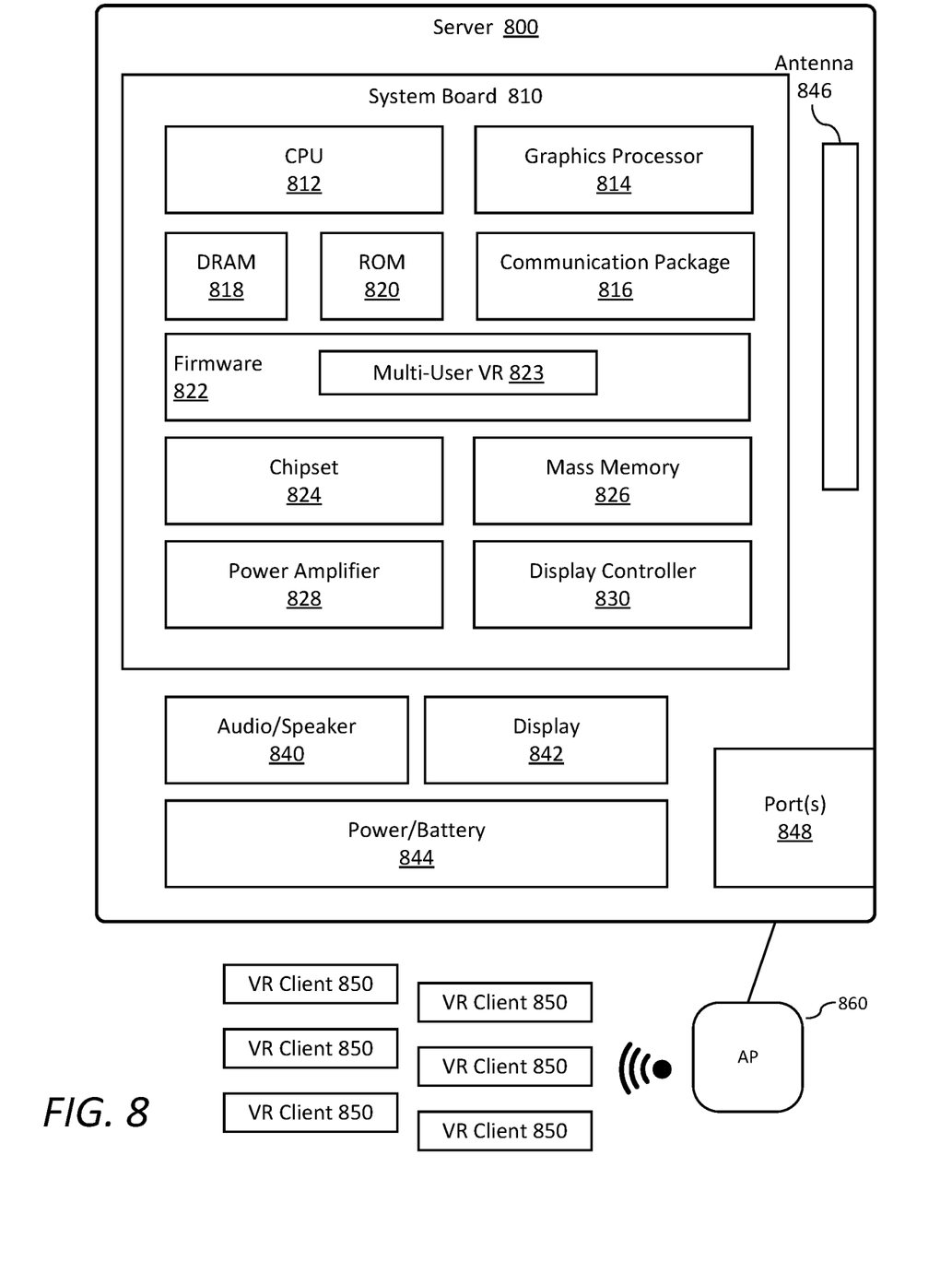
FIG. 8 illustrates a VR server in a system to provide multi-user VR services according to some embodiments.

FIG. 8 illustrates a VR server in a system to provide multi-user VR services according to some embodiments. A server 800 may include VR server 130 in VR system 120 as illustrated in FIG. 1 In some embodiments, the server 800 is an edge server including a wired or wireless connection to an access point 860 or other similar network device to provide multi-user VR services to VR clients 850, such as the client devices 110 illustrated in FIG. 1.

The server 800 includes a system board 810 (which may also be referred to as a motherboard, main circuit board, or other terms). The board 810 may include a number of components, including but not limited to one or more processors, such as a CPU 812 and graphics processor 814 (which may be included as a part of the CPU) and at least one communication package or chip 816. The communication package 816 is coupled to one or more antennas 846 and/or one or more ports 848 to provide communications, including wired or wireless communications with the AP 860.

Server 800 may further incorporate components including, but are not limited to, system memory such as DRAM 818, nonvolatile memory such as ROM 820 and firmware 822, wherein the firmware 822 may include elements to support multi-user VR services 823. Server may further include a chipset 824, a mass storage device (such as hard disk drive or solid-state drive) 826, a power amplifier 828, and a display controller. The components may be connected to the system board 810, mounted to the system board, or combined with any of the other components. The server 800 may further include or be connected to an audio device or speaker 840, a display 842, and a battery or other power element 844.

The communication package 816 enables wireless and/or wired communications for the transfer of data to and from the server 800, which may be in communication with the access point 860. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 816 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, one or more non-transitory computer-readable storage mediums having stored thereon executable computer program instructions that, when executed by one or more processors, cause the one or more processors to perform operations including receiving a request at a network device for a virtual reality (VR) operation, the VR operation to serve a plurality of VR client devices utilizing a wireless communication network; obtaining statistics regarding the wireless communication network and the plurality of VR client devices, the statistics including data transmission rates and data transmission quality; exposing the statistics to a server to assist with optimization of the wireless communication network; and facilitating optimization of the wireless communication network for multi-user VR operation based at least in part on the statistics.

In some embodiments, an access point includes a processor; a transmitter and receiver for wireless communication with one or more client devices; a memory for storage of data; and firmware including optimization of multi-user virtual reality service over a wireless network, wherein the access point is to: receive a request for a virtual reality (VR) operation, the VR operation to serve a plurality of VR client devices utilizing a wireless communication network; obtain statistics regarding the wireless communication network and the plurality of VR client devices, the statistics including data transmission rates and data transmission quality; expose the statistics to a server to assist with optimization of the wireless communication network; and facilitate optimization of the wireless communication network for multi-user VR operation based at least in part on the statistics.

In some embodiments, a method for optimizing multi-user virtual reality service over a wireless network includes receiving a request at a network device for a virtual reality (VR) operation, the VR operation to serve a plurality of VR client devices utilizing a wireless communication network; obtaining statistics regarding the wireless communication network and the plurality of VR client devices, the statistics including data transmission rates and data transmission quality; exposing the statistics to a server to assist with optimization of the wireless communication network; and facilitating optimization of the wireless communication network for multi-user VR operation based at least in part on the statistics.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:
   receiving a request at a network device for a virtual reality (VR) operation, the VR operation to serve a plurality of VR client devices utilizing a wireless communication network;
   obtaining statistics regarding the wireless communication network and the plurality of VR client devices, the statistics including data transmission rates and data transmission quality;
   exposing the statistics to a server to assist with optimization of the wireless communication network; and
   facilitating optimization of the wireless communication network for multi-user VR operation based at least in part on the statistics,
   wherein optimizing the wireless communication network includes:
   selection of a VR quality level based at least in part on a total available data throughput for the wireless communication network and a total data throughput demand for the plurality of client devices, wherein selection of the VR quality level includes:
   reducing the VR quality level upon determining that total throughput demands for the plurality of VR clients are greater than a total available downlink throughput.

2. The one or more storage mediums of claim 1, wherein optimization of the wireless communication network includes:
   selection between a multi-user MIMO (MU-MIMO (Multiple Input Multiple Output)) mode and a single user MIMO (SU-MIMO) or orthogonal frequency-division multiple access (OFDMA) mode based at least in part on total transmission delay for the plurality of client devices for each of the modes.

3. The one or more storage mediums of claim 2, wherein the selection of a mode includes selecting the SU-MIMO mode or OFDMA mode upon determining that a total latency for the SU-MIMO mode or OFDMA mode is less than a total latency for the MU-MIMO mode.

4. The one or more storage mediums of claim 1, wherein optimizing the wireless communication network includes:
   selection of either a multicast or unicast transmission mode for each of one or more groups of client devices based at least in part on total transmission delay for the client devices of each group for each of the transmission modes.

5. The one or more storage mediums of claim 4, further comprising executable computer program instructions that, when executed by the one or more processors, cause the one or more processors to perform operations comprising:
   generating predictions regarding possible sets of common frames among the plurality of VR client devices; and
   form the one or more groups based on the predicted common frames shared by VR client devices of the plurality of VR client devices.

6. The one or more storage mediums of claim 1, wherein selection of the VR client level further includes:
   increasing the VR quality level upon determining that a current VR quality level is less than a maximum quality level and a ratio between throughput demand for an increased quality and the total available downlink throughput is less than a certain probability.

7. The one or more storage mediums of claim 1, further comprising executable computer program instructions that, when executed by the one or more processors, cause the one or more processors to perform operations comprising:
   assigning a priority to VR traffic that is a high priority and is less than a maximum priority.

8. The one or more storage mediums of claim 1, wherein the wireless communication network includes IEEE 802.11ac or IEEE 802.11ax Wi-Fi technology.

9. A access point comprising:
   a processor;
   a transmitter and receiver for wireless communication with one or more client devices;
   a memory for storage of data; and
   firmware including optimization of multi-user virtual reality service over a wireless network, wherein the access point is to:
   receive a request for a virtual reality (VR) operation, the VR operation to serve a plurality of VR client devices utilizing a wireless communication network;
   obtain statistics regarding the wireless communication network and the plurality of VR client devices, the statistics including data transmission rates and data transmission quality;
   expose the statistics to a server to assist with optimization of the wireless communication network; and facilitate optimization of the wireless communication network for multi-user VR operation based at least in part on the statistics, wherein optimizing the wireless communication network includes:

selection of a VR quality level based at least in part on a total available data throughput for the wireless communication network and a total data throughput demand for the plurality of client devices, and wherein selection of the VR client level includes:

reducing the VR quality level upon determining that total throughput demands for the plurality of VR clients are greater than a total available downlink throughput or increasing the VR quality level upon determining that the current VR quality level is less than a maximum quality level and a ratio between throughput demand for an increased quality and the total available downlink throughput is less than a certain probability.

10. The access point of claim 9, wherein optimization of the wireless communication network includes:

selection between a multi-user MIMO (MU-MIMO (Multiple Input Multiple Output)) mode and a single user MIMO (SU-MIMO) or orthogonal frequency-division multiple access (OFDMA) mode based at least in part on total transmission delay for the plurality of client devices for each of the modes.

11. The access point of claim 9, wherein optimizing the wireless communication network includes:

selection of either a multicast or unicast transmission mode for each of one or more groups of client devices based at least in part on total transmission delay for the client devices of each group for each of the transmission modes.

12. The access point of claim 9, wherein the wireless communication network includes IEEE 802.11ac or IEEE 802.11ax Wi-Fi technology.

13. A method for optimizing multi-user virtual reality service over a wireless network comprising:

receiving a request at a network device for a virtual reality (VR) operation, the VR operation to serve a plurality of VR client devices utilizing a wireless communication network;

obtaining statistics regarding the wireless communication network and the plurality of VR client devices, the statistics including data transmission rates and data transmission quality;

exposing the statistics to a server to assist with optimization of the wireless communication network; and facilitating optimization of the wireless communication network for multi-user VR operation based at least in part on the statistics, wherein optimizing the wireless communication network includes:

selection of a VR quality level based at least in part on a total available data throughput for the wireless communication network and a total data throughput demand for the plurality of client devices, and wherein selection of the VR quality level includes:

reducing the VR quality level upon determining that total throughput demands for the plurality of VR clients are greater than a total available downlink throughput.

14. The method of claim 13, wherein optimization of the wireless communication network includes:

selection between a multi-user MIMO (MU-MIMO (Multiple Input Multiple Output)) mode and a single user MIMO (SU-MIMO) or orthogonal frequency-division multiple access (OFDMA) mode based at least in part on total transmission delay for the plurality of client devices for each of the modes.

15. The method of claim 13, wherein optimizing the wireless communication network includes:

selection of either a multicast or unicast transmission mode for each of one or more groups of client devices based at least in part on total transmission delay for the client devices of each group for each of the transmission modes.

* * * * *